United States Patent [19]

Belfort

[11] 4,165,297

[45] Aug. 21, 1979

[54] CATALYST COMPLEX FOR THE PREPARATION OF CYANO-AZO DYESTUFFS

[75] Inventor: Gérard L. A. Belfort, Oissel, France

[73] Assignee: Produits Chimiques Ugine Kuhlmann, Paris, France

[21] Appl. No.: 925,657

[22] Filed: Jul. 18, 1978

Related U.S. Application Data

[62] Division of Ser. No. 784,384, Apr. 4, 1977, Pat. No. 4,126,610.

[30] Foreign Application Priority Data

Apr. 9, 1976 [FR] France .................. 76 10421

[51] Int. Cl.² ............................... B01J 31/22
[52] U.S. Cl. .................. 252/429 R; 252/441
[58] Field of Search ............ 260/205, 206, 207, 207.1, 260/207.5, 208, 465 R, 465 H, 465.6, 465.8; 252/429 R, 441

[56] References Cited

U.S. PATENT DOCUMENTS

| | | | |
|---|---|---|---|
| 2,195,076 | 3/1940 | Braun et al. ............... | 260/378 X |
| 3,117,938 | 1/1964 | Burrus et al. ............... | 252/429 R |
| 3,772,268 | 11/1973 | Giles et al. ................. | 260/208 |

*Primary Examiner*—Patrick Garvin
*Attorney, Agent, or Firm*—Beveridge, DeGrandi, Kline & Lunsford

[57] ABSTRACT

A process for preparing a cyano-azo dyestuff which is insoluble in water and has the formula:

$$(CN)_n-A-N=N-B \qquad (I)$$

starting with a halogen-azo compound of formula:

$$(Hal)_n-A-N=N-B \qquad (II)$$

in which A denotes a benzenoid group containing a nitrile or halogen substituent(s) in ortho position with respect to the azo group;

Hal represents an atom of halogen, and preferably bromine or chlorine;

B denotes the radical of a coupling compound; and preferably a substituted para-aminoarylene radical;

A and B are devoid of groups which confer solubility in water and may contain other substituents such as halogen, alkyl, alkoxy, aryl, aralkyl, nitro, cyano, trifluoroalkyl, sulfonyl, acylamino, acyl, secondary or tertiary amino, or an ester of a carboxylic acid; and n is 1 or 2, wherein a compound of formula (II) is reacted with an alkali cyanide, preferably sodium cyanide, in the presence of water, and further in the presence of a solvent formed by a sulfide of formula:

$$NC-R-S-(R')_m-CN \qquad (III)$$

where R and R', which may be the same or different, denote an alkylene radical having from 1 to 6 carbon atoms and having a straight or branched chain which may contain —O— or —S— bridge; m is 0 or 1; and in the presence of a catalyst constituted by a molecular combination between the sulfide of formula (III) and a cuprous salt.

9 Claims, No Drawings

CATALYST COMPLEX FOR THE PREPARATION OF CYANO-AZO DYESTUFFS

This is a division of application Ser. No. 784,384, filed Apr. 4, 1977, now U.S. Pat. No. 4,126,610.

The present invention relates to a process of preparing cyano-azo dyes, utilizing the corresponding halogen compounds as starting materials.

The preparation of organic cyano compounds by reaction of the corresponding halogen compounds with a metallic cyanide, preferably cuprous cyanide, is well known in the literature. It is likewise known that cuprous cyanide may be utilized in the form of double compounds with amines or with aromatic or heterocyclic organic azo bases (for example according to U.S. Pat. No. 2,195,076); purely mineral complexes, for example NaCu(CN)$_2$, have also been described (in Journal of Organic Chemistry, Vol. 34, page 3626 (1969)).

The application of these methods of cyanation to halogenated azo dyes which are insoluble in water, have no hydrosolubilizing groups, and have the halogen atoms in the ortho position with respect to the azo group, has been described in many patents, for example French Pat. No. 1,511,932 applied for on Feb. 17, 1967; No. 1,524,647 applied for on May 26, 1967; No. 2,196,325 applied for on Aug. 14, 1973; and No. 2,258,430 applied for on Jan. 17, 1975.

The known processes nevertheless present, on the industrial scale, a certain number of drawbacks. In fact, in the great majority of cases, water-soluble polar organic solvents are utilized and, at the end of the reaction, have become diluted with water, so that their recovery appears difficult and in any case expensive (distillation); the absence of recovery causes industrial pollution and increases manufacturing costs considerably. Use of strongly polar solvents, such as for example dimethylformamide or dimethylsulfoxide, has been recommended in the prior art as these solvents increase the rate of reaction. However, the use of cuprous cyanide with these solvents leads to the formation of undesirable secondary products which reduce the yield and the quality of the dyes. As a result the purification of the cyano-azo dyes corresponding to the halogen-azo dyes cited above is a difficult operation which markedly increases the manufacturing cost.

Another considerable disadvantage resides in the fact that in all the known processes, the copper, which is necessary for the reaction as a catalyst, may be found in the dyestuff produced. The presence of residual copper, generally in the form of a cuprous halide of very low water solubility, necessitates a copper-removing treatment consisting either of completely taking up the dye in a medium which complexes or oxidizes the cuprous salts, or washing the crude cake of dyestuff with an organic solvent. On an industrial scale, this necessitates a long, costly and delicate system of purification. In any case, copper salts occur in the effluents of the purification process, likewise posing a threat of pollution. In addition, the copper is lost, which means the introduction of a fresh amount of copper is necessary for each industrial operation.

The present invention provides a new, economic and non-polluting industrial process, which enables advantageous results to be obtained, notably a particularly easy and simultaneous recovery of the solvent and the copper catalyst used in the production of cyano dyes. The cyano dye products are generally in a highly pure state thereby avoiding the necessity of further purification.

The invention relates to a process for the preparation of a cyano-azo dye which is insoluble in water and is represented by the formula:

$$(CN)_n\text{—}A\text{—}N\text{=}N\text{—}B \qquad (I)$$

As a starting material, a halogen-azo compound of the formula is used:

$$(Hal)_n\text{—}A\text{—}N\text{=}N\text{—}B \qquad (II)$$

in which A denotes phenylene containing the nitrile or halogen substituents in the ortho position with respect to the azo group;

Hal represents halogen such as fluorine, chlorine, bromine, iodine; and preferably bromine or chlorine;

B denotes the radical of a coupling agent, preferably a substituted para-aminoarylene radical;

A and B are devoid of groups conferring water-solubility, and can bear other usual substituents for azo dyes such as halogen, alkyl, alkoxy, aryl, nitro, aralkyl, cyano, trifluoroalkyl, sulfonyl, acylamino, acyl, secondary or tertiary amino, or ester of a carboxylic acid; and n is 1 or 2; wherein a compound of formula (II) is reacted with an alkaline cyanide, and such as lithium cyanide, sodium cyanide, and potassium cyanide, preferably sodium cyanide, in the presenc of water. The reaction is carried out in a sulfide solvent of the formula:

$$NC\text{—}R\text{—}S\text{—}(R')_m\text{—}CN \qquad (III)$$

where R and R', identical or different, denote an alkylene radical having from 1 to 6 carbon atoms, with a straight or branched chain which may contain an —O— or —S— bridge, m being 0 or 1 and in the presence of a catalyst constituted by a molecular combination between the sulfide of formula (III) and a cuprous salt.

Examples of the sulfide of formula (III), include bis-($\beta$-cyanoethylethyloxy) sulfide, bis-($\beta$-cyanoisobutyl) sulfide, bis-($\beta$-cyanopropyl)sulfide and, more particularly, bis-($\beta$-cyanoethyl)sulfide, which is manufactured industrially by treating H$_2$S with acrylonitrile. These compounds are generally known in the literature, but the advantage of using them for the preparation of cyano-azo compounds had not, to the knowledge of the applicant, ever previously been described. Now it has been determined that these bis-(cyanoalkyl) sulfides are, at usual reaction temperatures, excellent solvents for the halogen compounds of formula (II) and of the corresponding cyano compounds, such that the cyanation reaction can go to completion without risk of being blocked owing to partial insolubilization of the reactants taking part. From a strictly industrial point of view, bis($\beta$-cyanoethyl) sulfide, a cheap, odorless, non-toxic solvent is the preferred solvent for the new process. Bis($\beta$cyanoethyl)-sulfide offers the advantage, in relation to the other solvents generally recommended for the preparation of dyestuffs of formula (I), of having a very high boiling point (200° C. at a pressure of 7 mm of mercury) and good thermal stability. It thus becomes possible to carry out the reaction under atmospheric pressure, an in apparatus of simple structure without a sealing device for the vapor phase, even at temperatures above 150° C. The industrial apparatus is consequently simplified.

It is established that the compounds of formula (III) constitute good complexing agents for cuprous salts, and that in addition the copper complexes thus formed behave as valuable catalysts for cyanation reaction.

For example, a new catalyst (A) is prepared by combining equimolar quanties of the sulfide bis-(β-cyanoethyl) sulfide, a sulfide selected from the group of formula (III) sulfides, together with a compound of the formula (CuHal). Hal is selected from fluorine, chlorine, bromine and iodine. The resulting complex is represented by the formula:

[S(C₂H₄CN)₂][CuHal]

The catalytic properties of these complexes which were hitherto unknown, lead to an important result from the practical point of view. According to the present invention, and in contrast to the state of technology, the copper is not bound to the cyanide ion, so that the quantity of copper catalyst becomes independent on the quantity of cyanide; this enables not only variation at will of the quantity of catalyst but also its use in small quantities.

The applicant has likewise found, in the category of a new process, that the molecular combinations of copper and sulfide of formula (III) forming the catalyst complexes are soluble in compounds of formula (III); and these molecular combinations, as well as the compounds of formula (III) alone are insoluble or very slightly soluble in water. The compounds which are very slightly soluble in water have, according to the present invention, a solubility not generally exceeding 20 g per liter of water at ordinary temperature. This has the consequence that, in contrast to the known processes, it becomes particularly easy to recover, at the same time, the solvent and the copper catalyst which are used. It is sufficient, in fact, when the reaction is completed and after cooling and filtration of the dye, to carry out a simple washing with water, such that, after decantation of the filtrate, the solvent and the copper catalyst which it contains are recovered. It thus becomes possible to recycle the solvent and the copper catalyst a great number of times. From a practical point of view, the cyanation reaction essentially consumes only alkali cyanide, and the comsumption of copper derivative becomes very small or even negligible.

It is a feature of the present invention to provide the organic copper complex and method of making same. This is effected by addition of a cuprous salt to an excess of sulfide of formula (III). It is advantageous to heat gently in order to reduce the time required for complex formation and thus passage into solution. Optionally, one may also introduce into the reacting medium the previously isolated catalytic agent. The halogen-azo compound is then contacted with the complex and solvent and the mixture brought to the reaction temperature. The transformation into the cyano compound is then carried out by slowly flowing in a concentrated aqueous solution of alkali cyanide. Steam is allowed to escape from the reactor during this operation, so that its concentration is always low in the medium. Completion of the reaction is monitored by thin layer chromatography, and the reaction mass is then cooled.

The cyano dye, which has precipitated, and the alkali halide formed during the substitution, are separated by filtration. The cake of dye is then washed with water, which causes the displacement of the last parts of the solvent and of the copper catalyst which it contains.

The dye is generally of high purity and nearly completely free from residual copper salts. Customarily, the content of residual copper salts (expressed as elementary copper) in the dye (I) obtained does not exceed 0.5% and is generally less than 0.4% by weight.

In general, the yield of the reaction is good, and may exceed 98% of the theoretically calculated result. The organic phase is separated, by decantation for example, from the filtrate by washing, and it is reunited with the part of the solvent recovered at the time of filtration. This organic phase contains, apart from a little dissolved cyano dye, the sulfide (III) and the catalyst which were utilized at the beginning of the reaction. The organic phase is directly recycled for a new operation.

The reaction temperature can be varied over a wide range. Thus, the temperature should be adapted according to the specific case, principally according to the structure and nature of the halogen, of the compound of formula (II). In general, the working temperature ranges between 60° C. and 150° C., and more preferably between 80° C. and 130° C.

Included among the alkali cyanides that may be used according to the invention are salts of lithium, ammonium, and foremost, for practical reasons, those of potassium and sodium. To obtain a complete reaction, it is generally sufficient to employ the stoichiometric quantity of cyanide. This proportion may, however, be slightly augmented in certain cases without disadvantage to the process until about 1.2 times the stoichiometric quantity of cyanide is employed. Of course, when two halogen atoms are to be substituted, the quantity of cyanide must be doubled.

It has been observed that in a totally anhydrous medium the cyanation reaction proceeds very slowly and fails to reach completion. To obtain a good yield of reaction product, the presence of a certain quantity of water is necessary. In practice, it is advantageous to work with a quantity of water ranging between 3 and 10% of the weight of the solvent. Larger quantities of water generally do not disturb the reaction, so that the utilization of aqueous pastes of halogen dyes is possible.

In the molecular combinations of copper and of sulfide (III) forming the complex compounds, the cuprous salts to be used can be, without effect on the result of the reaction, a halide, or a derivative of a carboxylic acid such as, for example, acetate. It is however preferred, for practical reasons, to utilize cuprous bromide or chloride. The said molecular combinations may, in general, be isolated in the form of crystalline products which are stable and have definig melting points. This isolation may be done either directly from their concentrated solutions in sulfides (III), or from their alcoholic solutions in which they are sparingly soluble, or indeed from their aqueous salt solutions. Within the scope of the new process, it is not always necessary to isolate them. The quantity of catalyst necessary for the cyanation reaction to proceed can be very small. Thus, in practice, to obtain a convenient rate of reaction and good yields of cyano dye, it has been found that the proportion of catalyst should usually range between 0.1 and 1, and preferably between 0.25 and 0.5 atoms of copper per mole of starting halogen dye. In applicant's new process, an excess of catalyst, used to prepare a dyestuff, will not contaminate the dyestuff because the copper catalyst remains in the solvent phase.

The halogen-azo compounds of formula (II) may be prepared in a known manner, for example, by diazotization of an orthohalogen-aniline, followed by coupling of the diazo compound obtained with a coupling agent. The radicals A and B of formula (II) can contain substituents which are usual for the class of disperse azo dyes, for example, halogen, alkyl, alkoxy, aryl, aralkyl, nitro, cyano, trifluoroalkyl, sulfonyl, acylamino, acyl, secondary or tertiary amino, or ester or a carboxylic acid.

The dyes of formula (I) are principally utilized in disperse form for cellulose esters and for polyesters.

In conformity with a preferred method of the present invention, the cyano-azo dye of formula (I) corresponds to the formula:

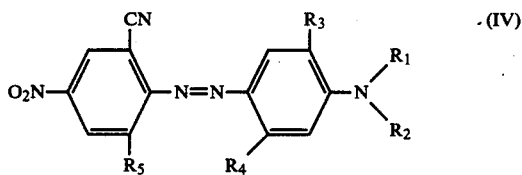

and the halogen-azo compound of formula (II) corresponds to one of the formulae:

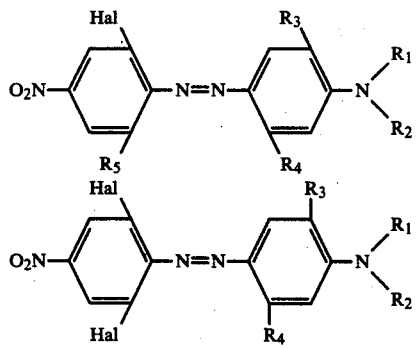

where $R_1$ denotes H, a simple alkyl group, or an alkyl group substituted with OH, Cl, F, CN, $COOR_6$, $OCO_2R_6$, $OR_6$, $OCOCH=CH$-phenyl, or a phenylalkyl group;

$R_2$ has the same meaning as $R_1$ or represents a phenyl or cyclohexyl group;

$R_3$ denotes H, $CH_3$, $OCH_3$, $OC_2H_5$ or COO-alkyl;

$R_4$ denotes H, $CH_3$, $OCH_3$, $OC_2H_5$, Cl, $NHSO_2R_6$, $NHCOOR_6$ or $NHCOR_6$;

$R_5$ denotes H, $CF_3$, $COR_6$, CN, $NO_2$ or $SO_2R_6$;

$R_6$ is an alkyl, cyclohexyl, phenyl, tolyl, or methoxyphenyl radical; and

Hal is selected from the group consisting of fluorine, bromine, chlorine, iodine and preferably bromine and chlorine.

The following examples, in which the parts are given by weight except where otherwise specified, illustrate the invention.

EXAMPLE 1

Into a reactor there are introduced 765 parts of bis(β-cyanoethyl) sulfide, followed by 14.35 parts of cuprous bromide. On heating to 60° C. with continuous stirring, a brownish-yellow solution of the copper complex is obtained. 95.8 parts of 3-acetamido-4-(2'bromo-4',6'-dinitrophenylazo)-N,N-diethylaniline are added, and the temperature is raised to 115° C. Raising the temperature to 115° C. causes the compound to completely dissolve. At ths temperature, a solution of 10.8 parts of sodium cyanide in 40 parts of water is introduced into the reactor during a period of 20 minutes, allowing the steam to escape. Stirring is continued for a further 20 to 30 minutes while verifying by thin layer chromatography that the starting organic bromoderivative is absent. The reaction mass is cooled to 30°-35° C., which causes crystallization of the dyestuff. The resultant product is filtered off, washed with water to displace the solvent contained in the paste, and dried. 80.2 parts of 3-acetamido-4-(2'cyano-4',6'-dinitrophenylazo)-N,N-diethylaniline are obtained. The titre (purity) of this product is 98.5% and it contains a copper concentration of less than 3000 parts per million. The wash water is introduced into a decanter, and the organic solvent part is withdrawn and reunited with the fraction of solvent obtained during filtration. There are thus recovered 720 parts of bis(β-cyanoethyl) sulfide which contain 4.35 parts of the cyanoazo dyestuff (giving an overall balance of the reaction of 98%) and 5.75 parts of copper (which corresponds to a recovery of 91% of the initial copper complex.

EXAMPLE 2

Starting with the bis(β-cyanoethyl) sulfide recovered in example 1, it is possible to carry out another reaction using additional 3-acetamido-4-(2'bromo 4',6'dinitrophenylazo)-N,N diethylaniline without having to add additional cuprous bromide. The reaction yields 86.6 parts of 3-acetamido-4-(2'-cyano-4',6'-dinitrophenylazo)-N,N-diethylaniline with a titre of 97.5% and a yield of 98.8%. The recovery of the bis(β-cyanoethyl) sulfide, under the same conditions as described previously, makes a new reaction possible.

EXAMPLE 3

The cuprous bromide is dissolved in the bis(β-cyanoethyl) sulfide as in Example 1. To the solution thus obtained are added 2500 parts of isopropanol. This addition causes the precipitation of the copper complex, which is then filtered off and dried. The catalyst thus isolated is in the form of a white powder having a melting point of 106° C. (melting complete)

Elementary analysis gives the following composition: carbon 25.29%, hydrogen 3.01%, nitrogen 9.78%, sulfur 11.19%, copper 22.70%, and bromine 28.24%; this corresponds to the formula:

In 350 parts by volume of bis(β-cyanoethyl) sulfide are dissolved 9.95 parts of the catalyst in the solid state, prepared as above; 47.9 parts of 3-acetamido-4-(2'-bromo-4'6'-dinitrophenylazo)-N,N-diethylaniline are added, and the mixture is heated to 115° C. During 15 minutes, there is then introduced, in an open reactor, a solution of 5.10 parts of sodium cyanide in 20 parts of water. After 30 minutes of stirring, the product formed is separated as described in Example 1. There are obtained 39 parts of 3-acetamido-4-(2'-cyano-4',6'-dinitrophenylazo)-N,Ndiethylaniline with a titre of 98%. This bis (β-cyano ethyl) sulfide is recovered under the same conditions as in Example 1; it contains, among other things, 2.75 parts of cyano dyestuff, and can be directly utilized for a new cyanation, without being necessary to purify it.

EXAMPLE 4

One dissolves 29.8 parts of copper chloride into 300 parts of water containing 90 parts of sodium chloride and about 1 part of hydrochloric acid in order to have a pH equal to 2. After the temperature reaches 50° C., one introduces, over the course of 1 hour, 43.2 parts of bis(β-cyanoethyl) sulfide. This addition causes the precipitation of the copper complex. After cooling, filtration and drying under vacuum at 40° C., one obtains 65 parts of a white crystalline powder whose analytical characteristics are the following:

| | |
|---|---|
| Melting point: | 148.5° C. (complete melting) |
| Elementary Analysis: | carbon 30.45% |
| | hydrogen 3.30% |
| | nitrogen 11.75% |
| | sulphur 13.50% |
| | copper 26.4% |
| | chlorine 14.75% |

These values correspond to the formula:

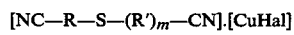

[S(C₂H₄CN)₂].[CuCl]

Principal bands of adsorption characteristic in infrared (KBr): 2982 (m), 2956 (m), 2925 (m), 2910 (F), 2265 (m), 2240 (F), 1430 (F), 1412 (f), 1400 (m).

Into 350 parts by volume of bis(β-cyanoethyl) sulfide brought to 40° C., one dissolves 11.95 parts of the catalytic agent in the solid state, previously prepared. One adds 47.9 parts of 3-acetamido 4-(2'bromo 4',6'dinitrophenylazo)-N,N-diethylaniline and heats to 115° C. One then carries out the cyananation in a similar manner as in Example 3. The results are identical and the bis(β-cyanoethyl) sulfide recovered, that includes the catalytic agent engaged at the separation, can be utilized directly for a new cyanation.

EXAMPLE 5

To 400 parts by volume of bis(β-cyanoethyl) sulfide are added 9.9 parts of cuprous chloride, and complex formation is obtained by heating with agitation. Then 51.28 parts of 3-acetamido-4-(2',6'-dibromo-4-nitrophenylazo)-N,Ndiethylaniline are introduced, and the temperature is brought up to 130° C. During 1 hour, in an open reactor, a solution of 12.7 parts of sodium cyanide in 40 parts of water is added to the reaction mixture and stirring is continued for 3 hours. After cooling to 55° C., the product formed in separated as in Example 1, giving 39.5 parts of 3-acetamido-4-(2',6'-dicyano-4'-nitrophenylazo)-N,N-diethylaniline. The yield is 95.5%.

EXAMPLE 6

7.175 parts of cuprous bromide are dissolved in 350 parts of bis(β-cyanoethyl) sulfide. 43.45 parts of 3-acetamido-4-(2'-chloro-4',6'-dinitrophenylazo)-N,N-diethylaniline are introduced, and the mass is brought to 130° C. During 1 hour 30 minutes, in an open reactor, a solution of 6.35 parts of sodium cyanide in 20 parts of water is added to the mixture and the mixture is stirred for 4 hours at 130°-135° C. The product formed is separated as in Example 1; 35.12 parts of 3-acetamido-4-(2'-cyano-4',6'-dinitrophenylazo)-N,N-diethylaniline are obtained. The yield is 82.5%.

EXAMPLE 7

Operating in an analogous manner as in example 1, and replacing bis(β-cyanoethyl) sulfide by the same quantity of (β-cyanoethyl-β-cyanoethoxyethyl) sulfide, there is obtained 79.8 parts of cyano azo dye with a titre of 98%. The (β-cyanoethyl-β-cyanoethoxyethyl) sulfide and the copper which it contains can be recycled after recovery for a new cyanation reaction.

EXAMPLE 8

Into a solution composed of 6.8 parts of cuprous bromide in 300 parts by volume of bis(β-cyanoethyl) sulfide, there are introduced 26 parts of 3-cinnamoylamino-4-(2'-bromo-4',6'-dinitrophenylazo)-N,N-diethylaniline. The mixture is heated to 100° C. and, during several minutes, a solution of 2.6 parts of sodium cyanide in 16 parts of water is allowed to flow in. Stirring is continued for 1 to 2 hours more, at 115° C. After cooling to 30° C., the 3-cinnamoylamino-4-(2'-cyano-4',6'-dinitrophenylazo)-N,N-diethylaniline formed is separated, under the same conditions as in example 1. The yield is 85.5%.

Further variations, modifications and changes will be apparent to those skilled in the art from the foregoing specification and are considered to be within the scope of the claims appended hereto.

I claim:

1. A catalyst complex of the formula:

[NC—R—S—(R')ₘ—CN].[CuHal]

in which R and R'are identical or different and represent alkylene having from 1 to 6 carbons in a straight chain or in a branched chain and which may contain an —O— or —S— bridge; m is 0 or 1; and Hal is selected from the group consisting of fluorine, chlorine, bromine and iodine.

2. A catalyst complex according to claim 1 wherein the sulfide is selected from the group consisting of bis-(β-cyanoethyl ethoxy) sulfide, bis-(β-cyanoisobutyl) sulfide, bis-(β-cyanopropyl) sulfide and bis-(β-cyanoethyl) sulfide.

3. A catalyst complex according to claim 2 wherein the sulfide is bis(β-cyanoethyl) sulfide.

4. A catalyst complex according to claim 1 wherein (CuHal) is cuprous bromide.

5. A catalyst complex according to claim 1 wherein (CuHal) is cuprous chloride.

6. A catalyst complex according to claim 1 having the formula:

[S(C₂H₄CN)₂].[CuCl]

7. A catalyst complex according to claim 1 having the formula:

[S(C₂H₄CN)₂].[CuBr]

8. A catalyst complex according to claim 1 of the formula:

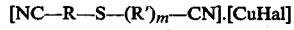

[NC—R—S—(R')ₘ—CN].[CuHal]

in which the sulfide is selected from bis-(β-cyanoethyl ethoxy) sulfide, bis-(β-cyanoisobutyl) sulfide, bis-(β-cyanoethyl) sulfide and bis-(β-cyanopropyl) sulfide; and (CuHal) is selected from the group consisting of cuprous bromide and cuprous chloride.

9. A process for the preparation of a catalyst complex claimed in claim 1 consisting of mixing equimolar quantities of the compounds NC—R—S—(R')ₘ—CN and (CuHal) wherein R, R', m and Hal are defined as in claim 1.

* * * * *